(12) United States Patent
Brooks et al.

(10) Patent No.: US 11,920,512 B2
(45) Date of Patent: Mar. 5, 2024

(54) POWERPLANT AND RELATED CONTROL SYSTEM AND METHOD

(71) Applicant: AeroVironment, Inc., Simi Valley, CA (US)

(72) Inventors: Alexander Nelson Brooks, Pasadena, CA (US); James Gallagher Daley, Ventura, CA (US)

(73) Assignee: Aero Vironment, Inc., Simi Valley, CA (US)

( * ) Notice: Subject to any disclaimer, the term of this patent is extended or adjusted under 35 U.S.C. 154(b) by 0 days.

(21) Appl. No.: 17/334,936

(22) Filed: May 31, 2021

(65) Prior Publication Data

US 2023/0313733 A1 Oct. 5, 2023

Related U.S. Application Data

(60) Continuation of application No. 16/200,598, filed on Nov. 26, 2018, now Pat. No. 11,022,030, which is a
(Continued)

(51) Int. Cl.
*F02B 37/12* (2006.01)
*F01N 3/20* (2006.01)
(Continued)

(52) U.S. Cl.
CPC .............. *F02B 37/12* (2013.01); *F01N 3/20* (2013.01); *F01N 9/00* (2013.01); *F02B 29/0412* (2013.01); *F02B 33/40* (2013.01); *F02B 37/013* (2013.01); *F02B 37/18* (2013.01); *F02B 37/20* (2013.01); *F02B 43/10* (2013.01); *F02B 73/00* (2013.01); *F02C 7/26* (2013.01); *F02D 19/024* (2013.01); *F02D 29/06* (2013.01); *F02D 41/0007* (2013.01); *F02D 41/0025* (2013.01); *F02M 21/0206* (2013.01); *B60W 2710/0644* (2013.01);
(Continued)

(58) Field of Classification Search
CPC ........ F02B 37/12; F02B 37/013; F02B 37/18; F02B 37/20; F02B 29/0412; F02B 33/40; F02B 43/10; F02B 73/00; F01N 3/20; F01N 9/00; F02C 7/26; F02D 19/024; F02D 29/06; F02D 41/0007; F02D 41/0025; F02D 41/065; F02D 41/083; F02D 41/1446; F02M 21/0206; B60Y 2400/435; Y02T 10/30; Y02T 10/12
USPC ............ 290/40 A, 40 B, 40 C, 51; 60/605.1, 60/605.2; 123/DIG. 12, 179.28, 588, 587, 123/586, 585, 567, 528, 525, 559.1, 3
See application file for complete search history.

(56) References Cited

U.S. PATENT DOCUMENTS 8,200,413 B2 * 6/2012 Brooks .................. F02B 37/20
123/3

* cited by examiner

*Primary Examiner* — Hai H Huynh
(74) *Attorney, Agent, or Firm* — Eric J. Aagaard, Esq.; The Law Office of John A Griecci

(57) ABSTRACT

A hydrogen fueled powerplant including an internal combustion engine that drives a motor-generator, and has a two-stage turbocharger, for an aircraft. A control system controls the operation of the motor-generator to maintain the engine at a speed selected based on controlling the engine equivalence ratio. The control system controls an afterburner, an intercooler and an aftercooler to maximize powerplant efficiency. The afterburner also adds power to the turbochargers during high-altitude restarts. The turbochargers also include motor-generators that extract excess power from the exhaust.

19 Claims, 5 Drawing Sheets

Related U.S. Application Data continuation of application No. 15/663,795, filed on Jul. 30, 2017, now Pat. No. 10,138,801, which is a continuation of application No. 15/009,776, filed on Jan. 28, 2016, now Pat. No. 9,719,411, which is a continuation of application No. 13/987,180, filed on Jul. 6, 2013, now Pat. No. 9,267,440, which is a continuation of application No. 13/507,072, filed on May 31, 2012, now Pat. No. 8,479,718, which is a division of application No. 12/586,627, filed on Sep. 23, 2009, now Pat. No. 8,200,413.

(60) Provisional application No. 61/194,048, filed on Sep. 23, 2008.

(51) Int. Cl.
*F01N 9/00* (2006.01)
*F02B 29/04* (2006.01)
*F02B 33/40* (2006.01)
*F02B 37/013* (2006.01)
*F02B 37/18* (2006.01)
*F02B 37/20* (2006.01)
*F02B 43/10* (2006.01)
*F02B 73/00* (2006.01)
*F02C 7/26* (2006.01)
*F02D 19/02* (2006.01)
*F02D 29/06* (2006.01)
*F02D 41/00* (2006.01)
*F02M 21/02* (2006.01)
*F02D 41/06* (2006.01)
*F02D 41/08* (2006.01)
*F02D 41/14* (2006.01)

(52) U.S. Cl.
CPC ....... *B60Y 2400/435* (2013.01); *F02D 41/065* (2013.01); *F02D 41/083* (2013.01); *F02D 41/1446* (2013.01); *Y02T 10/12* (2013.01); *Y02T 10/30* (2013.01)

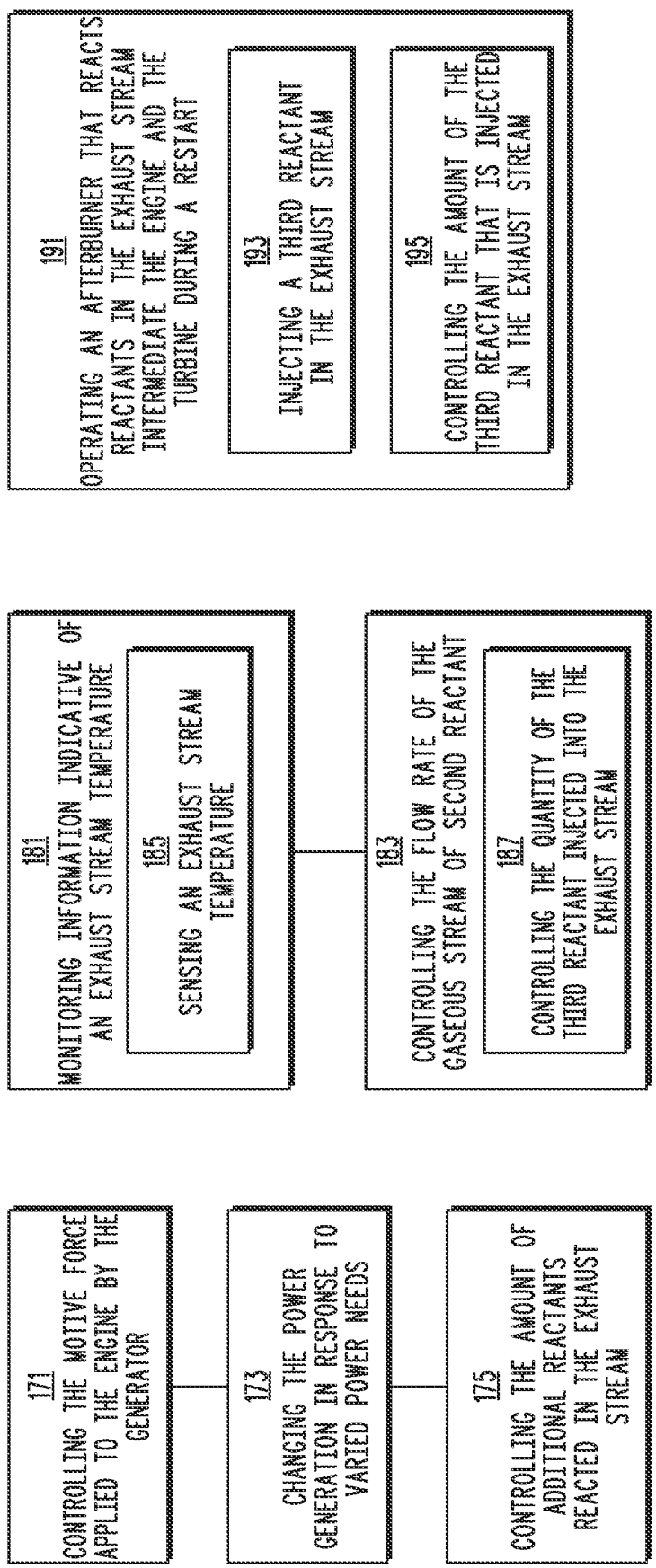

POWERPLANT AND RELATED CONTROL SYSTEM AND METHOD

This application is a Continuation Application of U.S. patent application Ser. No. 16/200,598, filed Nov. 26, 2018, which is a Continuation Application of U.S. patent application Ser. No. 15/663,795, filed Jul. 30, 2017, now U.S. Pat. No. 10,138,801, which is a Continuation Application of U.S. patent application Ser. No. 15/009,776, filed Jan. 28, 2016, now U.S. Pat. No. 9,719,411, which is a Continuation Application of U.S. patent application Ser. No. 13/987,180, filed Jul. 6, 2013, now U.S. Pat. No. 9,267,440, which is a Continuation Application of U.S. patent application Ser. No. 13/507,072, filed May 31, 2012, now U.S. Pat. No. 8,479,718, which is a Divisional Application of U.S. patent application Ser. No. 12/586,627, filed Sep. 23, 2009, now U.S. Pat. No. 8,200,413, which claims the benefit of U.S. Provisional Application No. 61/194,048, filed Sep. 23, 2008, each of which are incorporated herein by reference for all purposes.

The present invention relates generally to a hydrogen powerplant and, more particularly, to a powerplant having a hydrogen combustion engine, a turbocharger and an afterburner.

BACKGROUND OF THE INVENTION

High altitude long endurance aircraft require extremely efficient designs. Hydrogen-powered aircraft have been previously suggested to limit fuel weight and thereby maximize endurance. Regardless of the selected fuel, an oxidizer must be provided, and if ambient air is to be the oxidizer, it typically must be compressed at high altitudes. When hydrogen is the fuel, a significant amount of compressed air may remain unburned by an engine, and thus the energy of compression may be wasted for that unburned portion of the air.

It has been suggested that the use of electric motors for propulsion may be beneficial for high altitude long endurance aircraft. If a high altitude long endurance aircraft is to operate electric motors, a significant electrical power generation system is necessary. Such systems must be able to quickly adapt to changing power requirements, but complex systems with heavy components are detrimental, in that they limit the payload (or duration) of the aircraft, and typically have lower reliability. Simpler systems, on the other hand, may be limited in their ability to adapt to rapidly changing power requirements.

Conventional turbocharged engines are usually designed to control boost pressure using a wastegate. A wastegate is a controllable valve in the exhaust stream that bypasses some fraction of exhaust gases pass a turbocharger, thereby providing control over the turbocharger speed and resulting compressor boost. The continuous use of a wastegate can provide for the prompt ability to boost power (by closing the wastegate), but use of a wastegate wastes some of the energy that otherwise would be recoverable from the exhaust. In a high-altitude hydrogen powerplant, it is important to optimize efficiency, so a turbocharger system is typically set out to operate normally with zero wastegate flow. Because of this, it is not possible to increase boost by further using a wastegate.

Accordingly, there has existed a need for an aircraft powerplant that can provide highly efficient power with high reliability, while allowing for rapid changes in operating levels. Preferred embodiments of the present invention satisfy these and other needs, and provide further related advantages.

SUMMARY OF THE INVENTION

In various embodiments, the present invention solves some or all of the needs mentioned above, offering a powerplant that can provide efficient power with high reliability, while allowing for rapid changes in operating levels and addressing other related issues, such as engine startup and engine temperature limits.

The powerplant of present invention includes a combustion engine configured to produce motive force, a generator configured to generate power from the motive force of the engine. The engine has an inlet and an outlet. The generator is configured to apply a variable-level motive force to the engine. The powerplant further includes a control system configured to control the motive force applied to the engine by the generator. It is adapted to control the generator such that the generator maintains the engine speed at a selected, substantially constant speed during steady state engine operation, and to vary the engine speed during transient conditions based on maintaining an acceptable equivalence ratio and maximizing overall powerplant efficiency. Advantageously, this provides for the engine to be operated at selected speeds that promote maximum efficiency and reliability. The engine is further configured without a throttle, which improves both its weight efficiency and the reliability of the engine.

The powerplant further includes a turbocharger having a turbine and a compressor, and an afterburner in the exhaust stream intermediate the engine and the turbine. The afterburner is configured to react additional reactants in the exhaust stream, and the control system is configured to control the operation of the turbocharger by controlling the amount of additional reactants reacted in the exhaust stream. Advantageously, the resulting additional energy provides for the afterburner to partially or completely power the turbocharger, such as during engine startup, transitions in power levels, and the like. The resulting increased air flow rates can also be used to keep fuel levels lean, and thereby limit engine exhaust temperatures.

Advantageously, some aspects of the invention provide an expansion of achievable operating points without the need for a wastegate, the ability to restart the engine at high altitude, and the recovery of energy content of any unburned hydrogen in the exhaust of the powerplant core.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE DRAWINGS

FIG. 4 is a first method under the invention, using the embodiment depicted in FIG. 1.

FIG. 5 is a second method under the invention, using the embodiment depicted in FIG. 1.

FIG. 6 is a third method under the invention, using the embodiment depicted in FIG. 1.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention reside in a powerplant for a high-altitude long-endurance aircraft. The powerplant includes an engine (i.e., a machine that converts energy into mechanical force or motion) and a primary motor-generator configured to generate electricity using the motive force of the engine, to provide motive force to spin the engine, and to provide motive force to the engine to regulate the speed with which the engine spins. The engine uses a first reactant and a gaseous stream of a second reactant, which may respectively be a fuel such as hydrogen from a fuel source (e.g., a hydrogen tank), and a gaseous stream of an oxidizer such as air from an oxidizer source such as the atmosphere. Other fuels, oxidizers, fuel sources and oxidizer sources are also contemplated within the scope of the invention.

System Configuration

Figure 2:
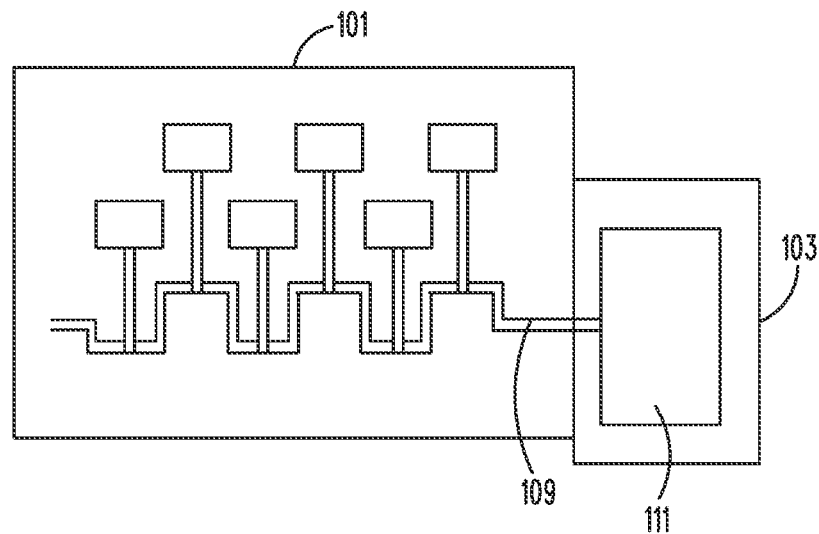
FIG. 2 is an elevation view of an engine and a generator of the embodiment depicted in FIG. 1.
Figure 3:
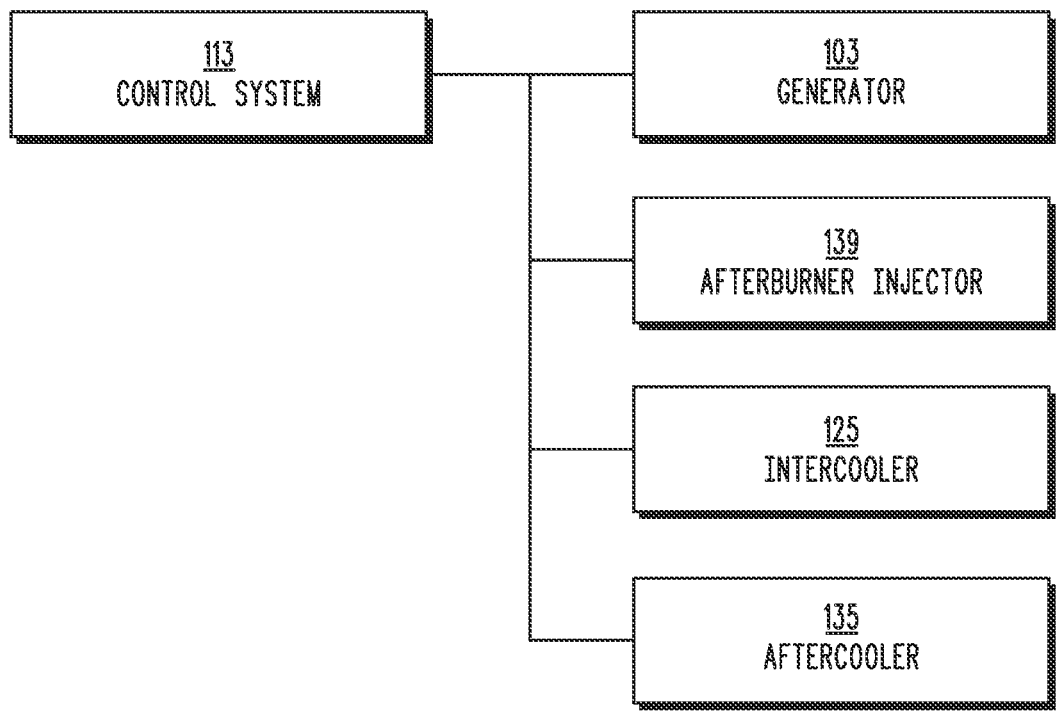
FIG. 3 is an system layout of the connections of a control system of the embodiment depicted in FIG. 1.

More particularly, with reference to FIGS. 1-3, the powerplant of the first embodiment includes a power generation system including an internal combustion piston engine 101 that drives a primary motor-generator 103 (hereinafter referred to as "the primary generator"). The engine is configured to produce rotational motive force, and has an inlet 105 and an exhaust outlet 107, as is commonly known. Optionally, the engine and primary generator may be integral in that they operate using a single, common shaft 109 that extends through both and serves as both an engine crankshaft and a generator shaft carrying a rotor 111. Optionally, the rotor may be sized to serve as a flywheel for the engine. Other types of engines are also contemplated within the scope of the invention.

The primary generator 103 is configured to generate electric power from the motive force of the engine 101 (e.g., from the rotation of the common shaft 109). The primary generator is further configured to apply a variable-level of motive force to the shaft of the engine. This motive force applied to the engine can actively spin the (shaft of the) engine, such as to start the engine, or can be used to control the speed with which the engine is running.

The powerplant also includes a control system 113 configured to control the operation of the powerplant over an envelope of operating conditions (e.g., over a range of power generation requirements and over a range of ambient conditions that can range from sea-level temperatures and pressures to stratospheric conditions). In a first aspect, the control system is configured to control the variable-level of motive force applied to the engine 101 by the primary generator 103 as the engine is driving the primary generator. In a second aspect, the control system is configured to energize the primary (motor-) generator as an electric motor to drive the engine.

More particularly, the control system 113 is configured to control the motive force applied by the primary generator 103 to the engine 101 based on a calculation of the engine equivalence ratio. More particularly, it is configured to control the motive force such that the primary generator controls and varies the engine speed during normal engine operation, over the envelope of operating conditions, such that the equivalence ratio is maintained within acceptable limits (which will typically depend on the type of fuel being used) and the overall powerplant efficiency is maximized. During both steady state conditions and transient conditions (e.g., during changes between different power generation levels or changes in ambient conditions) the equivalence ratio is selected to maximize powerplant efficiency, but will balance a preference for an optimal equivalence ratio with the thermal and mechanical limits of the various parts of the powerplant.

The variation of motive force by the generator is typically done by varying the magnetic field generated by field coils of the primary generator (e.g., by varying the electric power level that generates a magnetic field for the primary generator), but could also be accomplished by varying the number of active windings in the armature. For a given engine speed, as the motive force applied by the primary generator to the engine is increased, the electric power generated by the primary generator is also increased. Thus, when the engine power level increases, the primary generator increases its motive force to maintain engine speed, and thereby increases the power level it generates.

At high altitudes the ambient pressure is low, and to use ambient air as a source of gaseous engine oxidizer, a substantial amount of compression may be required to provide enough oxygen for combustion in the engine 101. To provide for the airflow requirements to support combustion, the present embodiment of a powerplant includes a compression system configured to compress gaseous engine oxidizer. More particularly, the compression system includes a ram-air scoop 119, a first-stage turbocharger including a first-stage compressor 121 and a first-stage turbine 123, an intercooler 125, a second-stage turbocharger including a second-stage compressor 131 and a second-stage turbine 133, an aftercooler 135, and an afterburner 137.

In operation, the first-stage compressor 121 receives air from the ram-air scoop 119, which is configured to use the flight speed of the aircraft to aid in efficiently gathering air. The first-stage compressor is driven in rotation to compress the gathered air (a gaseous engine oxidizer for the engine 101) from the ram-air scoop and generate a stream of once-compressed air that has been heated by the action of the first-stage compressor. The intercooler 125 then cools the once-compressed air to lower its temperature in preparation for further compression.

The second-stage compressor 131 receives the stream of once-cooled, once-compressed air from the intercooler 125, and is driven in rotation to further compress it to generate a stream of twice-compressed air that has been heated again, this time by the action of the second-stage compressor. The aftercooler 135 then cools the twice-compressed air to lower its temperature in preparation for induction onto the inlet 105 and then combustion. This decrease in engine air intake temperature provides a denser intake charge to the engine 101 and allows more air and fuel to be combusted per engine cycle, increasing the output of the engine. Thus, the powerplant includes two serial (i.e., located in series) compressors configured to compress a gaseous engine oxidizer for the engine, an intercooler configured to cool the gaseous engine oxidizer intermediate the two compressors, and an aftercooler configured to cool the gaseous engine oxidizer after compression by both of the two compressors.

Because aircraft systems must balance a variety of factors, including reliability, weight and energy efficiency, it is typically desirable to minimize the amount of structure, the number of moving parts, and systems that cause inefficient energy losses. In the present embodiment, the engine 101 does not use, and is not provided with, a throttle (i.e., a controllable inlet obstruction that causes a variable pressure drop to a stream of a gaseous inlet reactant such as the twice-compressed and twice-cooled ambient air).

More particularly, the engine 101 is configured with an inlet passageway extending serially from the ram-air scoop 119, through the first-stage compressor 121, the intercooler 125, the second-stage compressor 131, and the aftercooler 135 to terminate at the engine inlet 105. This inlet passageway is configured to pass a stream of gaseous engine oxidizer without limitation from a controllable obstruction (e.g., a throttle) that would cause a reduction in pressure of the gaseous engine oxidizer stream (i.e., creating a pressure drop from an upstream side of the obstruction to a downstream side of the obstruction).

It should be noted that a distinction is being drawn here between a controllable obstruction (i.e., a throttle), and an obstruction that is configured to at all time minimize its resistance to flow (e.g., piping between components, or the coolers, which are configured to minimize their flow resistance while maximizing their cooling of the stream of air). Moreover, the inlet passageway is configured to always provide the stream of gaseous engine oxidizer to the engine inlet 105 at substantially the pressure level established by the second-stage compressor 131, in that it differs only by a small amount caused by the aftercooler 135 and piping, which varies only as a function of a constant loss coefficient (and of fluid velocity), rather than being characterized by a variable loss coefficient.

After the fuel and oxidizer are mixed, combustion occurs, and the engine converts some of the energy of the combustion into the motive force of the engine. The combusted fuel and oxidizer are then passed out the exhaust outlet 107 into an exhaust passageway. The exhaust passageway extends serially from the exhaust outlet, through the afterburner 137, the second-stage turbine 133 and the first-stage turbine 123 before ending at a port configured to expel the exhaust into the ambient atmosphere. Thus, the afterburner is located in the exhaust stream intermediate the engine and the turbines.

Unlike a gasoline engine, which normally operates in a stoichiometric mode in which the fuel reacts all of the oxygen in the air, the hydrogen engine 101 of the present embodiment typically operates in a mode in which the oxygen reacts substantially all of the fuel, and some oxygen remains present. Thus, the engine is a hydrogen-fueled engine configured to run with an equivalence ratio of less than one. With excess oxygen in the exhaust from the powerplant core (i.e., the engine), there is the potential to burn additional fuel in the exhaust. This afterburning capability in an exhaust stream has been employed previously to provide additional propulsion for an aircraft takeoff. This was done by burning fuel in an exhaust stream that was directed through a power-takeoff turbine mechanically coupled to a propeller.

In operation, the afterburner of the present embodiment receives exhaust air directly from the engine 101. As discussed above, typically this exhaust will principally contain some gaseous second reactant in the form of an oxidizer, along with combustion exhaust product. Nevertheless, an exhaust containing a fuel and exhaust product, or containing fuel, oxidizer and possibly an exhaust product (in the case of incomplete engine combustion) are contemplated within the scope of the invention.

The afterburner 137 is configured to react additional reactants in the exhaust stream, and more particularly, it includes an afterburner fuel injector 139 configured to inject a third reactant into the exhaust stream. In this embodiment the third reactant is a hydrogen fuel (and the injector is a hydrogen fuel injector). Typically the third reactant will be a fuel of the same type as the first reactant (i.e., the fuel reacted in the engine 101, e.g., hydrogen), though it could be one of another type, or it could be an oxidizer.

The afterburner 137 may be of any known type, but will typically be a catalytic burner to maximize combustion of the remaining reactants until the supply of one reactant is substantially exhausted. The diameter of the catalyst bed in the afterburner is selected such that there is an inconsequential pressure drop across the afterburner. The afterburner injector 139 and an optional mixer (not shown) is typically placed several diameters upstream of the burner. A means of controlling the mass flow of the injected reactant is provided. This may typically be a hydrogen mass flow controller or one or more pulse-width modulated fuel injectors.

When fuel and oxidizer are being reacted in the afterburner 137, additional energy is added to the exhaust stream. From the afterburner the exhaust stream is directed through the second-stage turbine 133, which is driven in rotation by the exhaust stream, and thus removes energy from the exhaust stream to drive the second-stage compressor 131 in rotation.

Likewise, from the second-stage turbine 133, the exhaust stream is directed through the first-stage turbine 123, which is driven in rotation by the exhaust stream, and thus removes energy from the exhaust stream to drive the first-stage compressor 121 in rotation. Optionally, an additional or alternative afterburner 141 (and optionally a related afterburner fuel injector 143) could be located along the exhaust passageway intermediate the second- and first-stage turbines 133, 123. While it is possible that this is a less efficient use of an afterburner, it could both avoid exposing the second-stage turbine 133 to excessive temperatures, and provide a more direct and controllable influence over the operation first-stage turbine 123. It also may be a less expensive device, as it would not need to operate in the high temperatures of the primary afterburner 137.

Using the catalytic afterburner 137, it is possible to add energy to the exhaust to boost power when an increase in compression is needed. Because the burning of fuel in the afterburner to power the turbines does not add directly to the motive force the engine applies to the primary generator 103, the injection of reactant into the afterburner will typically only be done for only short, selected periods of time. It is better to operate with lower efficiency during such short periods using the afterburner, than to operate with lower inefficiency for long periods of time, such as would occur by using a frequently open wastegate that could be closed to provide momentary power boosts.

A turbocharger system for a high altitude powerplant will typically be quite large and can have significant heat capacity, which takes a significant amount of time to warm up to operating temperature after a normal engine start. One such time for afterburner operation may be during a system start. By reacting additional hydrogen in the exhaust during a warm-up operation, the afterburner 137 can generate the additional heat needed for warming the turbines 123, 133. This can significantly accelerate the operation of warming the turbochargers up to operating temperatures, avoiding excessive operation at cold temperatures. Thus, the system includes a control system configured to control the operation of the afterburner to power the turbine during a system cold start such that the warming of the turbine to operational temperatures is accelerated over a start without the afterburner. This feature may be augmented with the use of turbine temperature sensors, or with information on the typical time for the turbine to come up to speed.

An exception to the generally short times of afterburner operation may be during engine idle while at high altitude. Engine idle typically occurs with only a minimum amount of fuel use, and thus has only a minimum amount of energy available in the exhaust. Nevertheless, at high altitude it may take a significant amount of energy to compress even the small amount of air needed for idling the engine 101. Thus, the engine exhaust at idle may not have enough energy to keep the turbochargers powered adequately to provide even the minimal compression needed at idle. Using the afterburner 137 to provide additional energy in the exhaust (typically by reacting additional fuel) can provide the additional energy needed by the turbines to maintain adequate compression for engine operation.

If at any time the engine 101 incompletely reacts the reactants (i.e., if the exhaust contains more than trace amounts of both a fuel and an oxidizer), the catalytic afterburner 137 can also react these reactants without any additional efficiency losses (e.g., on spent fuel or energy lost to additional compression). For example, at very lean operating points, a hydrogen internal combustion engine might not completely burn all of the injected hydrogen. The catalytic afterburner in the exhaust passageway will react the unburned hydrogen, capturing energy as heat that would otherwise have been lost. This captured heat energy may be partially converted to mechanical energy in the first- and second-stage turbines 123, 133, increasing their ability to drive the first- and second-stage compressors 121, 131 in rotation.

The powerplant is designed for efficient operation at typical operating conditions, such as those it will experience during the majority of flight conditions. While it is preferable that the system operates with a minimum of energy loss at all times, there may be limited time periods when the compression capability of the system detrimentally overwhelms the engine requirements. One such time might be when the powerplant is in a low-power mode. This could, for example, occur during a descent (characterized by minimum thrust power requirements) when no payload power is needed. Another such time may be during a rapid change in the fuel-flow rate.

To accommodate the operation of the powerplant during these limited times, the powerplant is provided with one or more energy bleed devices. A first type of such device is configured to lower the energy available in the exhaust stream to drive the turbines 123, 133. A first such device of this type is a low-pressure wastegate 161 configured to bleed off some of the pressurized exhaust prior to it being used to drive the first-stage (i.e., low pressure) turbine 123. Another such device of this type is a high-pressure wastegate 163 configured to bleed some of the pressurized exhaust around the second-stage (i.e., high pressure) turbine 133. The high-pressure wastegate can alternatively be configured to externally bleed the pressure out of the system, and thereby lower the energy available to both the first- and second-stage turbines.

A second type of energy bleed device is configured to bleed off the compressed gaseous stream prior to its being ingested by the engine 101. A first such device of this type is an engine bypass 165 configured to bleed off some of the compressed gaseous stream into the engine exhaust. It can be located either prior to or after the aftercooler 135. Another such device of this type is an inlet blow-off valve 167 configured to bleed off some of the compressed gaseous stream immediately prior to it being received by the inlet 105, or alternatively, prior to the aftercooler. As was previously noted any one, two, three or four of these in combination are contemplated within the scope of the invention, and the number, size and types used may vary depending on the characteristics of a particular design. For example, for some designs only the inlet blow-off valve 167 may be needed.

Variation in Power Generation Levels

As noted above, the primary generator 103 is controlled to maintain the engine (and primary generator rotor) speed at speeds appropriate to control the equivalence ratio to acceptable levels (even through changing fuel flow requirements). Nevertheless, the aircraft will require differing levels of electrical power generation depending on the flight conditions, the flight plan, and the varying demands of the aircraft systems and the aircraft payload. The primary generator generates various levels of electrical power at a power generation level related to a rate at which fuel is provided to the engine 101 (and likewise, to the level of motive force the primary generator applies to the engine to keep it at an acceptable equivalence ratio).

The greater the fuel level supplied to the engine 101, the greater the motive force supplied by the engine, and the more resistance to rotation the primary generator 103 applies to maintain a constant engine and rotor speed. This increase in resistance is the natural result of increased power generation, and thus when the rate of fuel fed to the engine increases, the level of electrical power generation also increases. Thus, within the operating envelope of the engine and primary generator, a wide range of power generation levels can be achieved, each with an associated fuel-flow rate to the engine.

Nevertheless, transition between two far-apart power levels can be problematic, as the steady state operating conditions of the engine 101, turbochargers and coolers 125, 135 can be substantially different, and each device has a limited range of operation in which it is efficient and safe for operation. For example, the fuel to oxidizer ratio of the engine needs to be maintained within a safe operating range—even during a transition. A rapid change in fuel-flow rate that is not accompanied by a proportional change in air flow rate could cause an engine misfire or over temperature event.

Likewise, for any given pressure boost ratio, each turbocharger has a characteristic range of corrected air flow rates for which a given level of efficiency (i.e., a percentage of turbo shaft power that converts to actual air compression) can be maintained. These ranges are typically represented on a compressor map, which identifies envelopes of operation for various levels of efficiency, as well as limits past which the compressor will have failure conditions such as surge or choke. A rapid increase in engine 101 backpressure could cause a surge condition, which is characterized by a pulsating backflow through the compressor and a violent vibration of the system.

Without any assistance, a transition between two far-apart power levels could be accomplished using a very gradual transition between the related fuel-flow rates. However, such a slow transition would not be conducive to providing a quick response to changing power needs.

To better provide for transition between power levels, the control system 113 controls the rate at which fuel flows to the engine 101 and the rate at which the engine rotates, the rate at which fuel flows to the afterburner injector 139 of the afterburner 137, and the rate at which coolant flows to each cooler (i.e., the intercooler 125 and the aftercooler 135). Alternatively (or in conjunction), other control mechanisms such as turbocharger wastegates and various system blow-off valves and bypasses can be controllably employed by the control system to maintain the system components in efficient operating ranges while rapidly transitioning between fuel-flow levels.

As will be described below, the control system 113 is configured (e.g., it is a computer programmed to transmit control signals) to provide for efficient transition between powerplant power generation levels using a variety of control parameters. It is also within the scope of the invention for the control system to control less than all of these parameters. For example, an alternative embodiment of the invention could have a control system configured to only control the rate at which fuel flows to the engine 101 and the rate at which fuel flows to the afterburner 137.

Afterburner

A catalyst may be used to readily react hydrogen with oxygen. No flame is required to maintain the reaction, and such a catalytic burner can operate over a very wide range of equivalence ratios (i.e., the ratio of the hydrogen flow to the hydrogen flow that would be needed to fully react with all of the oxygen present). Operated in a hot exhaust stream, a catalyst bed of a catalytic burner will react even extremely small amounts of hydrogen. There is no concern about keeping a stable flame front or a flame blowing out. In an exhaust stream containing oxygen, any added hydrogen will react when it passes through a catalytic burner. Nevertheless, the maximum amount of hydrogen added must be limited in order to keep the catalyst bed and turbine below their maximum operating temperatures.

In one aspect of the invention, the control system 113 is configured to control the operation of one or both turbochargers to improve engine efficiency during a transition in generated power levels. More particularly, when a rapidly increasing engine fuel-flow rate could drive the engine 101 into a less efficient (or an undesirable) equivalence ratio (e.g., a ratio causing an engine misfire or over temperature event), the control system commands the afterburner fuel injector 139 to inject fuel into the afterburner 137 prior to and/or during the increase in the engine fuel-flow rate. The resulting increase in exhaust stream energy increases the operation (i.e., rotation rate) of both turbochargers, and particularly of the second-stage turbocharger. The increased turbocharger rotation rate provides for a compression boost, i.e., an increased flow rate of the gaseous second reactant (e.g., of pressurized air) to the inlet 105, and thus provides for a better equivalence ratio during the engine fuel-flow rate transition.

Likewise, when a rapidly decreasing engine fuel-flow rate could drive the engine 101 into a less efficient (or an undesirable) equivalence ratio (e.g., a ratio causing the engine to run too lean), and if the afterburner fuel injector 139 is already injecting fuel (such as might occur during takeoff or other conditions characterized by high power requirements), the control system 113 commands the afterburner fuel injector to inject less fuel (or no fuel) into the afterburner 137 prior to and/or during the decrease in the engine fuel-flow rate. The resulting decrease in exhaust stream energy decreases the operation (i.e., rotation rate) of both turbochargers. The decreased turbocharger rotation rate provides for a decreased flow rate of the gaseous second reactant (e.g., of pressurized air) to the inlet 105, and thus provides for a better equivalence ratio during the engine fuel-flow rate transition. Thus, the control system is configured to control the operation of the turbochargers by controlling the amount of additional reactants reacted in the exhaust stream.

In either case, once the engine fuel-flow rate reaches a steady state condition, the system will typically have an appropriate (i.e., increased or decreased, respectively) energy level available in the exhaust stream of the engine 101 to support the turbochargers at the new operation levels (usually without additional fuel being supplied to the afterburner 137). Thus, the operation of the afterburner can be used to speed a change in turbocharger compression rates, and thereby increase the response efficiency (i.e., the response time while maintaining an efficient, safe and functional operating condition) with which the powerplant can respond to a change in power requirements.

Intercooler

In another aspect of the invention, the control system 113 is also configured to control the operation of the turbocharger to improve engine 101 efficiency, both during steady state operation and during a transition in generated power levels, but this time by a different method. As noted above, the efficient operation of a compressor is related to the corrected air flow, i.e., the corrected mass flow rate of air, taking into account air density (ambient temperature and pressure). Thus, by adjusting the temperature of the air being compressed, the efficiency of the compressor can be controlled, and more importantly, can be maintained within safe operation limits.

With regard to control over the rate at which coolant flows to the intercooler, the control system 113 monitors the operation of the second-stage turbocharger using sensors typically known for monitoring turbocharger operation. These turbocharger operation sensors and related processing will provide a necessary set of parameters for determining where the second-stage compressor is operating on its compressor map, e.g., the compressor rotation rate, the compression ratio, the air temperature, and other related parameters.

In response to changes in powerplant operating conditions, e.g., changes in power generation requirements and/or in altitude, the control system 113 commands the rate of coolant delivered to the intercooler 125 to be increased or decreased in order to change the corrected air flow rate to the second stage compressor, and thereby drive the compressor operating point to a place that improves and preferably maximizes the powerplant system efficiency. It should be noted that it is powerplant efficiency is the goal of the changes in coolant delivery. Turbocharger efficiency may likewise be improved, but it is not necessarily so.

Aftercooler

The efficient operation of the powerplant is closely related to the engine equivalence ratio, i.e., the fuel to air ratio over the fuel to air ratio that would provide for complete reaction of all the fuel and oxidizer. By adjusting the temperature of the gaseous oxidizer stream (the twice-compressed and cooled air stream) at the inlet 105, the density of the stream can be changed, and the amount of air being mixed with each quantity of fuel of a reciprocating engine, can be adjusted.

The operation of the aftercooler 135 can be controlled by the control system to selectively change the engine 101 inlet air temperature. The control system 113 is thereby configured to control the operation of the aftercooler to improve, and preferably maximize, engine efficiency at all required operating conditions.

Method of Generating Power

Figure 1:
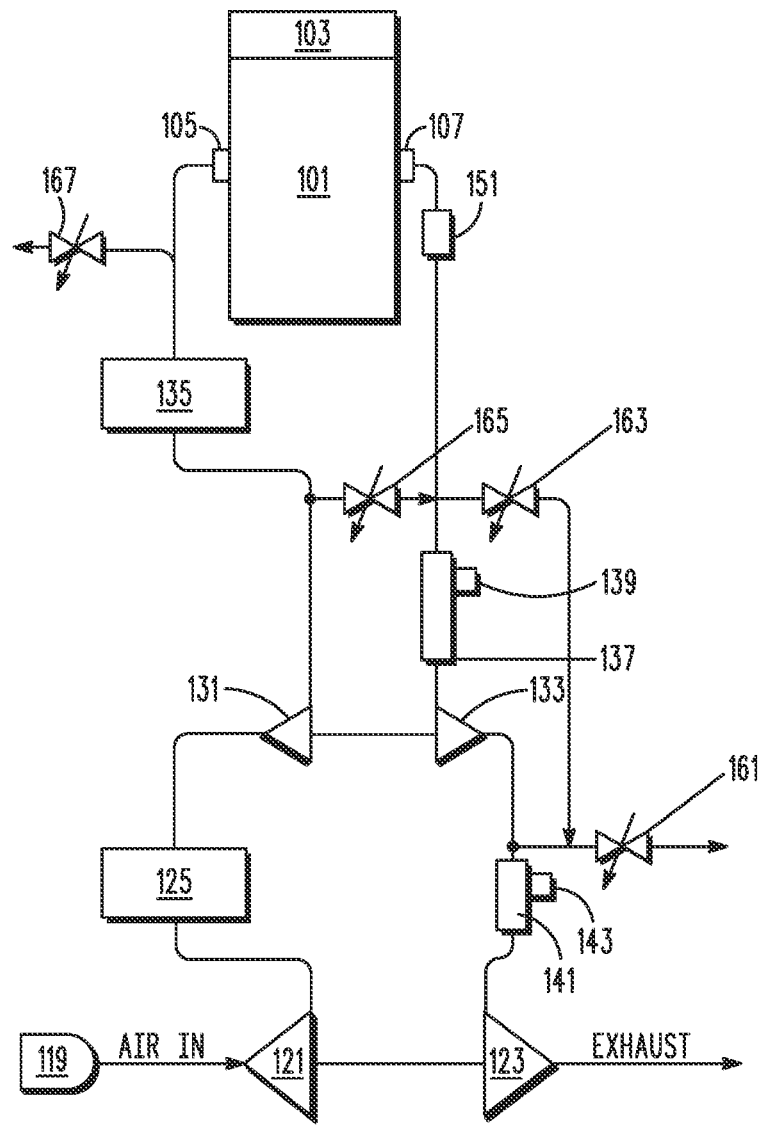
FIG. 1 is a system layout of a first embodiment of a powerplant under the invention.

With reference to FIGS. 1 & 4, using the above-described combustion engine 101 configured to produce motive force, and using the primary generator 103 configured to generate power from the motive force of the engine, the invention provides a method of generating power. The method includes the step of controlling 171 the motive force applied to the engine by the primary generator such that the primary generator maintains the engine equivalence ratio in an appropriate range to maximize powerplant efficiency while keeping all components within their thermal and mechanical operating limits.

As noted above, the primary generator 103 generates power at a power generation level related to a rate at which fuel is provided to the engine 101. The method includes the step of varying 173 the rate at which fuel is provided to the engine in order to change the power generation in response to varied power needs.

In further using at least one of the above-described turbines 123, 133 driven by the exhaust stream of the engine 101, at least one related compressor 121, 131, which is configured to compress gaseous engine oxidizer for the engine, and the above-described afterburner 137 intermediate the engine and the turbines, the method further includes the step of controlling 175 the amount of additional reactants reacted in the exhaust stream to maximize powerplant efficiency while keeping all components within their thermal and mechanical limits.

Operating Temperature Limits

With reference to FIGS. 1 & 5, some hydrogen internal combustion engines have a propensity to back-flash or backfire if their exhaust gets too hot. Also, the catalyst beds of catalytic burners have temperature limits. Under an aspect of the present invention, during very high power operation the engine 101 is operated leaner than would otherwise be optimal (e.g., leaner than would be typical at moderate power) in order to maintain the engine exhaust temperature below a predefined limit. The third reactant, (the hydrogen fuel) is injected into the exhaust by the afterburner injector 139, and reacted in the afterburner 137. This achieves a higher turbine energy extraction, and thus a higher compressor boost pressure, and results in a higher gaseous reactant flow rate that maintains a leaner engine operation and a lower engine exhaust temperature.

More particularly, the control system 113 is configured to monitor and respond to the exhaust temperature of the engine 101, either by directly measuring that exhaust temperature (one aspect of the operating condition of the engine), or by monitoring other aspects of the operating condition of the engine that are indicative of exhaust temperature. In the former case, in order to monitor the exhaust temperature, the powerplant is equipped with a temperature sensor 151 positioned and configured to sense the temperature of the engine exhaust stream from the exhaust outlet 107. In alternative embodiments, the system controller 113 is provided with information allowing it identify operating conditions during which the exhaust temperature needs to be lowered. Such relevant information may include engine fuel injection rates, engine cooling system activity, and the like.

As previously recited, in response to a given power generation requirement, a required fuel-flow rate for meeting the requirement is identified by the control system 113. The control system transitions the engine 101 to operate at the desired fuel-flow rate (i.e., it sends control signals to the engine fuel injection system and other systems as described above to transition to fuel flowing to the engine at the identified fuel-flow rate). The control system is configured to control the flow rate that the gaseous stream of second reactant is provided to the engine, based on the operating condition of the engine, such that the exhaust stream temperature is maintained below a temperature limit.

In the case where the control system 113 monitors the actual exhaust temperature, the control system 113 is configured to control the flow rate that the gaseous stream of second reactant is provided to the engine 101 based on the exhaust stream temperature sensed by the temperature sensor 151, such that the sensed exhaust stream temperature is maintained below the temperature limit. Thus, based on the sensed exhaust stream temperature, (i.e., in response to an engine exhaust temperature that approaches or exceeds a limit value), or alternatively in response to engine operating conditions that are understood to produce temperatures that approach or exceed the limit value, the control system transmits control signals causing the flow rate of the gaseous stream of second reactant to be increased such that the exhaust stream temperature is maintained below the temperature limit.

In the present embodiment, the control system 113 is configured to control the flow rate of the gaseous stream of second reactant by transmitting control signals that control the operation of the compressors 121, 131, and/or that control the operation of the coolers 125, 135 (and particularly the aftercooler 135). The control system is further configured to control the operation of the compressors by having the control signals control the driving force from the turbines 123, 133 to drive the compressors.

To implement this, the control system 113 of the embodiment is configured to control the driving force from the turbines 123, 133 by having the control signals control the amount of additional reactants that are injected by the afterburner injector 139 into the exhaust stream and reacted by the catalytic afterburner 137. The temperature limit of the present embodiment is a constant, but the broadest scope of the invention is understood to include temperature limits that are functions of various parameters, such as altitude.

This aspect of the invention includes a related method of limiting the temperature of an exhaust stream of an engine 101. This method includes the step of monitoring 181 information indicative of an exhaust stream temperature, and the step of controlling 183 the flow rate of the gaseous stream of second reactant based on the monitored information such that the exhaust stream temperature is maintained below a temperature limit. The step of monitoring may include the step of sensing 185 an exhaust stream temperature, and the step of controlling may comprise controlling the flow rate of the gaseous stream of second reactant based on the sensed exhaust stream temperature such that the exhaust stream temperature is maintained below a temperature limit.

In the case where the engine 101 is provided with a compressor, a turbine, a catalytic afterburner 137, and an afterburner injector, as have been described above, in the step of controlling, the flow rate of the gaseous stream of second reactant may be controlled by controlling 187 the quantity of the third reactant injected into the exhaust stream by the afterburner injector.

Engine Restart at Altitude

When an aircraft powerplant becomes shut down while flying at high altitudes, there are potential difficulties that may limit its ability to restart. Even though the primary generator 103 may be able to turn the engine 101 at reasonably high speed, the airflow through the engine during engine cranking will be very low due to low outside air density. To meet the necessary air-fuel ratio for combustion this small airflow would correspondingly require a very small hydrogen flow rate.

Nevertheless, fuel injectors may have a minimum hydrogen flow rate that is too high to achieve the correct mixture with such low airflow. Moreover, a certain level of combustion will be necessary for engine startup. Thus, a powerplant that is at a very high altitude may be faced with a significant requirement for oxidizer compression to meet both the necessary air-fuel ratio for combustion and the minimum fuel flow necessitated by the engine configuration.

With reference to FIGS. 1 & 6, under another aspect of the invention applicable to this embodiment, the engine 101 is cranked at a high speed, and hydrogen fuel is added to the exhaust by the afterburner injector 139 and reacted in the afterburner 137 before introducing hydrogen fuel into the engine fuel injectors. The heat added to the exhaust by the afterburner adds energy to the turbines 123, 133, and thus powers the air compression system to bring up at least a small level of compression boost. This boost increases airflow through the engine, which provides sufficient airflow to meet the requirement for oxidizer compression based on the necessary air-fuel ratio for combustion and the minimum fuel flow necessitated by the engine configuration.

In the embodiment, the above-described engine 101, which includes one or more compressors 121, 131, one or more related turbines 123, 133 (forming turbochargers with the compressors), an afterburner 137 and a control system 113, is configured for use in a range of ambient conditions. The control system is configured to restart the engine in at least some ambient conditions of the range of ambient conditions by controlling the operation of the afterburner to power the turbine(s) such that the compressor(s) are driven at a speed that provides for the gaseous stream of second reactant to be provided to the engine at a flow rate at or above a threshold level. This threshold level may be a constant, or it may be a function dependent upon altitude, temperature, and other such parameters.

Under this aspect of the invention, the control system 113 may control the afterburner 137 by transmitting control signals to an afterburner injector 139 configured to inject a third reactant (e.g., hydrogen fuel) in the exhaust stream for reaction by the afterburner. The control system is configured to control the amount of additional reactants reacted in the exhaust stream by controlling the quantity of the third reactant injected into the exhaust stream by the afterburner injector.

This aspect of the invention further includes a related method of restarting an engine 101. As previously stated, the engine is configured to react a gaseous stream of second reactant (e.g., compressed air), which is provided to the engine at a flow rate, with a second reactant (e.g., a hydrogen fuel) to produce energy and an exhaust stream, and is configured for use in a range of ambient conditions.

Under the method, an afterburner 137 that reacts reactants in the exhaust stream intermediate the engine 101 and the turbine is operated 191 during a restart of the engine. This is done such that a compressor is driven by a turbine at a speed that provides for the gaseous stream of second reactant to be provided to the engine at a flow rate at or above a threshold level. The afterburner is operated by the control system 113 transmitting control signals causing an injection 193 of a controlled amount 195 of a third reactant (e.g., a hydrogen fuel) in the exhaust stream for reaction by the afterburner.

Alternative Power Recovery

It is anticipated that in a typical hydrogen internal combustion engine, only about half of the oxygen is burned. That means that half the energy used in compression is not recovered in combustion. Another embodiment of the invention provides for the recovery of some of this energy, and provides for further synergies with other system operation needs.

Figure 7:
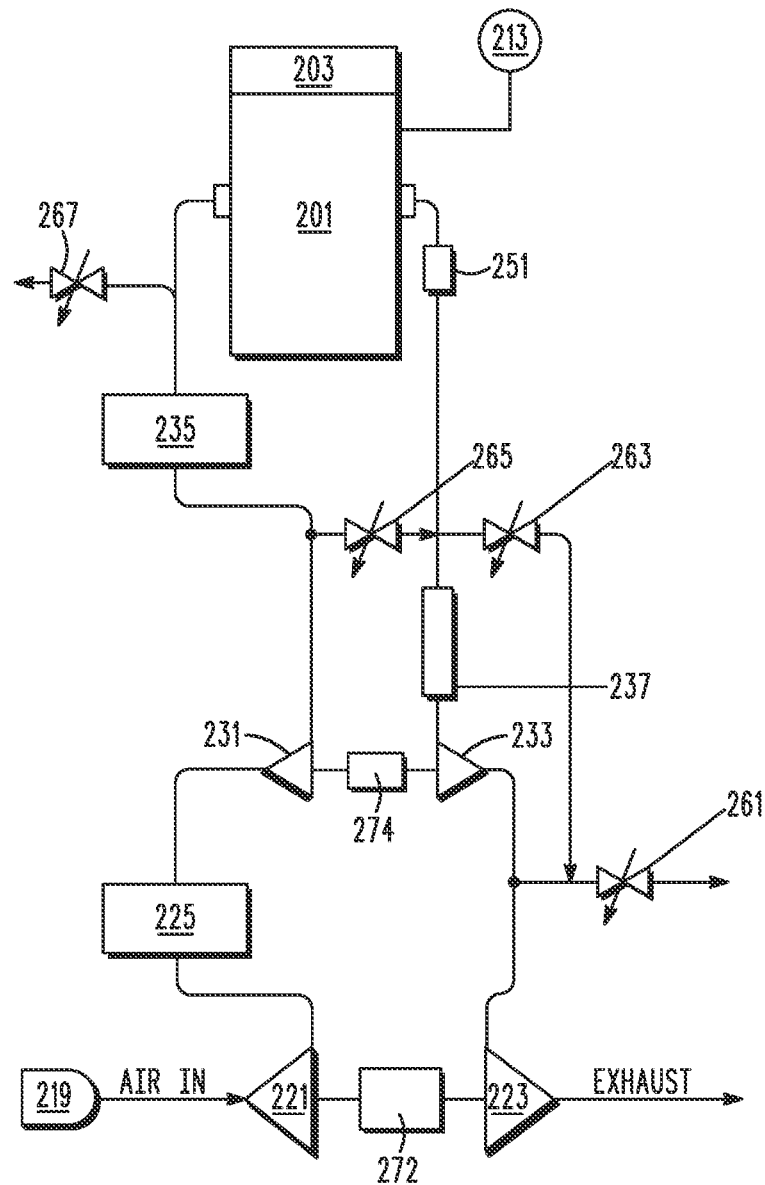
FIG. 7 is a system layout of another embodiment of a powerplant under the invention.

With reference to FIG. 7, a second embodiment of the invention is identical to the first (using reference numbers incremented by 100 for like components), with the exception of certain additional components, and with the control system being configured to advantageously operate the components. More particularly, the second embodiment may be provided with an internal combustion piston engine 201 that drives a primary motor-generator 203 ("the primary generator"), a control system 213, a ram-air scoop 219, a first-stage turbocharger including a first-stage compressor 221 and a first-stage turbine 223, an intercooler 225, a second-stage turbocharger including a second-stage compressor 231 and a second-stage turbine 233, an aftercooler 235, an afterburner 237, a temperature sensor 251, a low-pressure wastegate 261, a high-pressure wastegate 263, an engine bypass 265 and an inlet blow-off valve 267.

The embodiment further includes a first turbine generator 272 that is driven by the shaft that connects the first-stage turbine 221 and first-stage compressor 223, and a second turbine generator 274 that is driven by the shaft that connects the second-stage turbine 231 and second-stage compressor 233. By using the afterburner 237 to burn some of the remaining oxygen in the exhaust and increase the exhaust temperature, an excess of energy is made available via the expansion of the exhaust through the turbines over the level that is needed to power the air compression system. This energy is recovered using these electric turbine generators. In this embodiment, the control system is configured to control the injection of fuel into the afterburner at a rate to maximize the energy efficiency of the powerplant.

It is anticipated that so the overall inefficiency of recovering the added energy may be in the 30-40% range. Alternative embodiments may be configured with only one of the two described turbine generators, or with the addition of a separate turbine and turbine generator in the exhaust stream.

In a variation of this embodiment, the turbine generators can be configured to controllably generate a variable level of power (and cause a resulting motive force to be applied to their related turbines), such as by having field coils that can be energized to a variety of levels. The control system is configured to control the motive force applied by the turbine generators to their respective turbines such that the turbine generators only remove excess power, but allow for the compressors to operate at their most efficient levels given the current conditions.

The controlled extraction of power by the turbine generators provides for additional synergies in light of the various functions described above for the afterburner and coolers. For example, when a rapidly decreasing power requirement causes the engine fuel-flow rate to rapidly decrease, the control system increases the power generation levels of the turbine generators (i.e., the motive force with which they resist the rotation of the turbines). This causes a decrease in the speed of the turbochargers, and a rapid reduction in the rate of compression by the compressors, compensating for an increasing pressure ratio across the compressor and avoiding an approach to a surge condition (similar to that discussed above regarding intercooler activity).

Similarly, if the turbine generators are actively generating electricity and a rapidly increasing power requirement causes the engine fuel-flow rate to rapidly increase, the control system decreases the power generation levels of the turbine generators (i.e., the motive force with which they resist the rotation of the turbines). This causes a rapid increase in the speed of the turbochargers, and an increase in the rate of compression by the compressors, avoiding an impending approach to a choke condition (again, similar to the discussion above regarding intercooler activity).

Thus, the operation of the turbine generators can be controlled to maintain high efficiency levels in the first- and second-stage compressor compression rates, and thus increase the efficiency (i.e., the response time while maintaining an efficient, safe and functional operating condition) with which the powerplant can respond to a change in power requirements. The control system is configured to control the operation of the turbine generators to improve engine efficiency during a transition in generated power levels.

Furthermore, the turbine generators can optionally be configured to operate as motors. Thus, when an increase in turbocharger speed is needed (either on startup or when the fuel-flow rate is increasing), electrical energy can be applied to the turbine generators and the compressors can operate at levels higher than would otherwise be available.

Fuel Cell Variant

Figure 8:
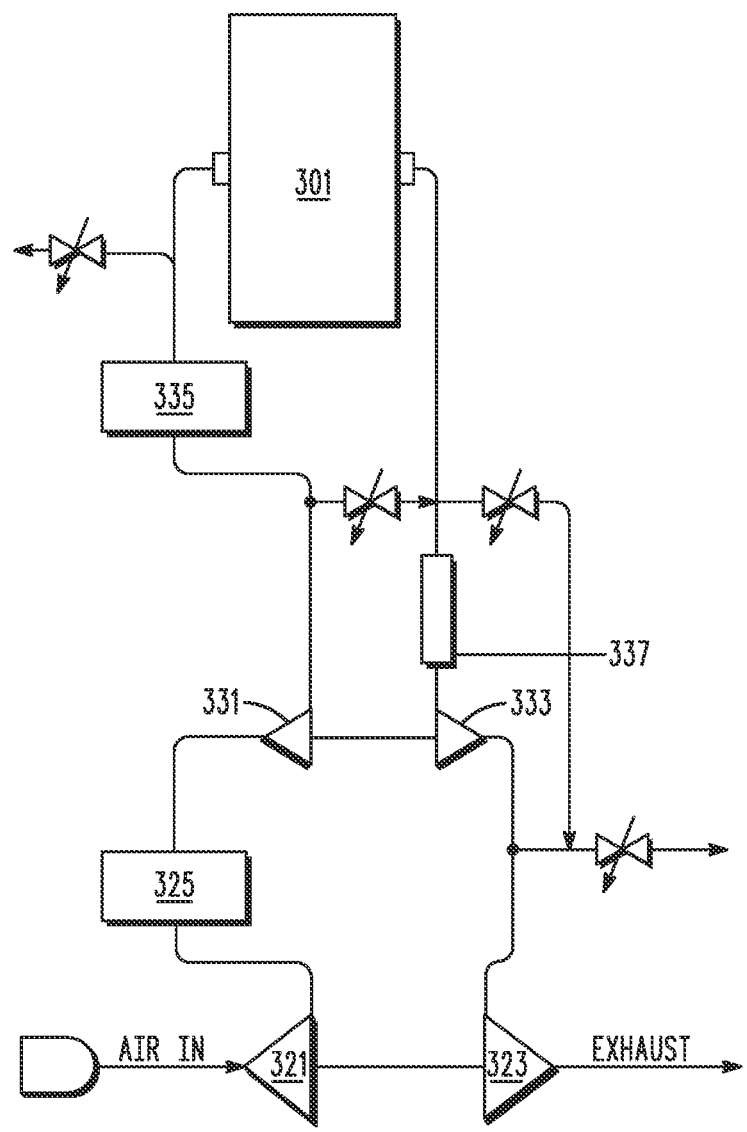
FIG. 8 is a system layout of yet another embodiment of a powerplant under the invention.

With respect to FIG. 8, in some variations of the present invention, the powerplant may comprise a power generation system in the form of a fuel cell 301, rather than an engine and a primary generator. With the fuel cell, a compression system may still be needed to compress a gaseous stream of reactant (e.g., an oxidizer such as air). For a fuel cell system, the exhaust may still have around half of the original oxygen content of the inlet air. Therefore, in a configuration similar to those previously disclosed, an afterburner 337 can be used in the exhaust stream to power one or two turbochargers that provide for the compression needed to run the fuel cell. An intercooler 325 and an aftercooler 335 can likewise be used, similar to the way described above for an internal combustion engine with a generator.

Thus, an aspect of the present invention contemplates a fuel cell power generation system configured to react a first reactant with a gaseous stream of second reactant to produce energy and an exhaust stream, along with a first-stage compressor 321, a second-stage compressor 331, a first-stage turbine 323, a second-stage turbine 333, an afterburner 337, and a control system (not shown, but substantially similar to those described above). The compressors are configured to pressurize the gaseous stream of second reactant supplied to the power generation system.

The compressors 321, 331 are driven in rotation by a driving force from the turbines 323, 333, which are propelled by the exhaust stream. The afterburner 337 is located in the exhaust stream intermediate the power generation system and the turbines, and is configured to react reactants in the exhaust stream. The control system is configured control the operation of the afterburner. It does so at a rate such that the compressors are driven at a speed that provides for the gaseous stream of second reactant to be provided to the power generation system at a flow rate appropriate to a rate at which the first reactant is being provided to the power generation system.

The system also has a component for initial startup airflow to feed the afterburner. This component may either be a motor generator on one or both turbines (not shown, but shown and described for previous embodiments), or a compressed air start system.

It is to be understood that the invention comprises apparatus and methods for designing powerplants, and for producing powerplants, as well as the apparatus and methods of the powerplant itself. Additionally, the various embodiments of the invention can incorporate various combinations of the above-described features. Moreover, it is contemplated that the claims are broader than the described embodiment.

For example, the above embodiments all recited that the second gaseous reactant was an oxidizer, that the first and third reactants were of the same type (a fuel) and the same composition (hydrogen), and that the equivalence ratio was less than one, leaving excess oxidizer in the exhaust. It is well within the invention to have the system compress and control the flow of gaseous fuels, to use different fuels, to use a equivalence ratio of greater than one, and/or to add an oxidizer as the third reactant. In short, the above disclosed features should not unduly limit the claims, and can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A powerplant, comprising:
    an engine configured to react a first reactant with a gaseous stream of second reactant to produce energy and an exhaust stream, the gaseous stream of second reactant being provided to the engine at a flow rate; and
    a control system configured to monitor an altitude at which the engine is operating;
    wherein the control system configured to control the flow rate of the gaseous stream of second reactant based on the monitored altitude, and based on the operating condition of the engine, such that an exhaust stream temperature is maintained below a temperature limit.

2. The powerplant of claim 1, and further comprising a temperature sensor positioned and configured to sense the temperature of the exhaust stream, wherein the control system is configured to monitor the temperature of the exhaust stream using the sensor, and wherein the control system is configured to control the flow rate of the gaseous stream of second reactant based on the monitored temperature.

3. The powerplant of claim 1, and further comprising a compressor configured to pressurize the gaseous stream of second reactant supplied to the engine, wherein the control system is configured to control the flow rate of the gaseous stream of second reactant by controlling the operation of the compressor.

4. The powerplant of claim 3, and further comprising a turbine, wherein the compressor is driven in rotation by a driving force from the turbine, wherein the turbine is propelled by the exhaust stream, and wherein the control system is configured to control the operation of the compressor by controlling the driving force from the turbine.

5. The powerplant of claim 4, and further comprising an afterburner in the exhaust stream intermediate the engine and the turbine, the afterburner being configured to react additional reactants in the exhaust stream, wherein the control system is configured to control the driving force from the turbine by controlling the amount of additional reactants reacted in the exhaust stream.

6. The powerplant of claim 5, and further comprising an injector configured to inject a third reactant in the exhaust stream for reaction by the afterburner, wherein the control system is configured to control the amount of additional reactants reacted in the exhaust stream by controlling the quantity of the third reactant injected into the exhaust stream.

7. The powerplant of claim 6, wherein:
the first reactant is a first fuel;
the second reactant is a gaseous oxidizer; and
the third reactant is a second fuel.

8. The powerplant of claim 7, wherein the first fuel is hydrogen, wherein the second fuel is hydrogen, and wherein the engine is configured to operate at an equivalence ratio of less than one.

9. A method of limiting the temperature of an exhaust stream of an engine configured to react a first reactant with a gaseous stream of second reactant to produce energy and the exhaust stream, the gaseous stream of second reactant being provided to the engine at a flow rate, comprising:
monitoring information indicative of an altitude at which the engine is operating;
monitoring information indicative of an exhaust stream temperature; and
controlling the flow rate of the gaseous stream of second reactant based on the monitored information indicative of an altitude and the monitored information indicative of an exhaust stream temperature, such that the exhaust stream temperature is maintained below a temperature limit.

10. The method of claim 9, wherein the step of monitoring information indicative of an exhaust stream temperature includes the step of sensing an exhaust stream temperature; and wherein the step of controlling comprises controlling the flow rate of the gaseous stream of second reactant based on the sensed exhaust stream temperature such that the exhaust stream temperature is maintained below a temperature limit.

11. The method of claim 9, wherein the engine is provided with
a compressor configured to pressurize the gaseous stream of second reactant supplied to the engine,
a turbine configured to drive the compressor, and configured to be propelled by the exhaust stream,
a catalytic afterburner in the exhaust stream intermediate the engine and the turbine, the afterburner being configured to react additional reactants in the exhaust stream, and
an injector configured to inject a third reactant in the exhaust stream for reaction by the afterburner;
wherein in the step of controlling, the flow rate of the gaseous stream of second reactant is controlled by controlling the quantity of the third reactant injected into the exhaust stream by the injector.

12. A powerplant, comprising:
an engine configured to react a first reactant with a gaseous stream of second reactant to produce energy and an exhaust stream, the engine being configured for use in a range of ambient conditions, wherein the gaseous stream of second reactant is provided to the engine at a flow rate;
a compressor configured to pressurize the gaseous stream of second reactant supplied to the engine;
a turbine, wherein the compressor is driven in rotation by a driving force from the turbine, and wherein the turbine is propelled by the exhaust stream;
an afterburner in the exhaust stream intermediate the engine and the turbine, the afterburner being configured to react reactants in the exhaust stream; and
a control system configured to monitor a parameter of the group of parameters consisting of an altitude at which the engine is operating and a temperature at which the engine is operating;
wherein the control system is configured to restart the engine in at least some ambient conditions of the range of ambient conditions by controlling the operation of the afterburner to add energy to the turbine such that the compressor is driven at a speed that provides for the gaseous stream of second reactant to be provided to the engine at a flow rate at or above a threshold level that is dependent upon the monitored parameter.

13. The powerplant of claim 12, and further comprising an injector configured to inject a third reactant in the exhaust stream for reaction by the afterburner, wherein the control system is configured to control the amount of additional reactants reacted in the exhaust stream by controlling the quantity of the third reactant injected into the exhaust stream by the injector.

14. The powerplant of claim 13, wherein:
the first reactant is a first fuel;
the second reactant is a gaseous oxidizer; and
the third reactant is a second fuel.

15. The powerplant of claim 14, wherein the first fuel is hydrogen, wherein the second fuel is hydrogen, and wherein the engine is configured to operate at an equivalence ratio of less than one.

16. The powerplant of claim 12, wherein the monitored parameter is the altitude at which the engine is operating.

17. The powerplant of claim 12, wherein the monitored parameter is the temperature at which the engine is operating.

18. A method of restarting an engine that is configured to react a first reactant with a gaseous stream of second reactant to produce energy and an exhaust stream, the engine being configured for use in a range of ambient conditions, wherein the gaseous stream of second reactant is provided to the engine at a flow rate, wherein the engine is provided with a compressor and a turbine, wherein the compressor is configured to pressurize the gaseous stream of second reactant supplied to the engine and a turbine, wherein the compressor is driven in rotation by a driving force from the turbine, and wherein the turbine is propelled by the exhaust stream, comprising:
monitoring a parameter of the group of parameters consisting of an altitude at which the engine is operating, and a temperature at which the engine is operating;
operating an afterburner that reacts reactants in the exhaust stream intermediate the engine and the turbine during a restart of the engine, such that the compressor is driven at a speed that provides for the gaseous stream of second reactant to be provided to the engine at a flow rate at or above a threshold level that is dependent upon the monitored parameter.

19. The method of claim 18, wherein the step of operating an afterburner includes injecting a third reactant in the exhaust stream, and wherein the operation of the afterburner is controlled by controlling the amount of the third reactant that is injected in the exhaust stream.

* * * * *